United States Patent
Hida et al.

(10) Patent No.: US 8,850,105 B2
(45) Date of Patent: Sep. 30, 2014

(54) METHOD FOR CONTROLLING MEMORY SYSTEM, INFORMATION PROCESSING APPARATUS, AND STORAGE MEDIUM

(75) Inventors: Toshikatsu Hida, Kanagawa (JP); Michiko Noguchi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 233 days.

(21) Appl. No.: 13/420,051

(22) Filed: Mar. 14, 2012

(65) Prior Publication Data
US 2012/0260025 A1  Oct. 11, 2012

(30) Foreign Application Priority Data

Apr. 8, 2011  (JP) ................................. 2011-086697

(51) Int. Cl.
*G06F 12/02* (2006.01)
*G06F 3/06* (2006.01)

(52) U.S. Cl.
CPC .......... *G06F 12/0246* (2013.01); *G06F 3/0644* (2013.01); *G06F 3/0613* (2013.01); *G06F 3/0616* (2013.01); *G06F 2212/7204* (2013.01); *G06F 2206/1008* (2013.01); *G06F 3/0679* (2013.01); *G06F 2212/7205* (2013.01)
USPC ............................................. 711/103; 711/6

(58) Field of Classification Search
CPC .................... G06F 12/0246; G06F 2206/1008; G06F 2212/7204; G06F 2212/7205; G06F 3/0613; G06F 3/0616; G06F 3/0644; G06F 3/0679
USPC ...................................... 711/103, 6
See application file for complete search history.

(56) References Cited

U.S. PATENT DOCUMENTS

| | | | |
|---|---|---|---|
| 7,953,920 B2 | 5/2011 | Yano et al. | |
| 7,962,688 B2 | 6/2011 | Yano et al. | |
| 8,065,470 B2 | 11/2011 | Yano et al. | |
| 8,065,471 B2 | 11/2011 | Yano et al. | |
| 2005/0021917 A1* | 1/2005 | Mathur et al. | 711/159 |
| 2007/0083781 A1* | 4/2007 | Aoyagi | 713/300 |
| 2009/0222628 A1 | 9/2009 | Yano et al. | |
| 2010/0161885 A1 | 6/2010 | Kanno et al. | |
| 2011/0060863 A1 | 3/2011 | Kimura et al. | |
| 2011/0099326 A1* | 4/2011 | Jung et al. | 711/103 |

FOREIGN PATENT DOCUMENTS

| | | |
|---|---|---|
| JP | 6-332806 | 12/1994 |
| JP | 2005-202942 | 7/2005 |
| WO | WO 2011/074712 A1 | 6/2011 |

OTHER PUBLICATIONS

U.S. Appl. No. 13/420,808, filed Mar. 15, 2012, Hashimoto.
U.S. Appl. No. 13/462,905, filed May 3, 2012, Yoshihashi et al.
U.S. Appl. No. 13/312,129, filed Dec. 6, 2011, Daisuke Hashimoto.

* cited by examiner

*Primary Examiner* — Hashem Farrokh
(74) *Attorney, Agent, or Firm* — Oblon, Spivak, McClelland, Maier & Neustadt, L.L.P.

(57) ABSTRACT

A method, to be executed by an application program according to an embodiment, for controlling a memory system provided with a nonvolatile memory includes: acquiring an unused memory area from an operating system installed in an information processing apparatus provided with the memory system; prohibiting the acquired unused memory area from being used by any application program other than the above application program; acquiring the address of the acquired unused memory area; and notifying the address of the acquired unused memory area to the memory system. In the method according to an embodiment for controlling a memory system, prohibition state put by the prohibiting is preserved until receiving a change instruction.

33 Claims, 12 Drawing Sheets

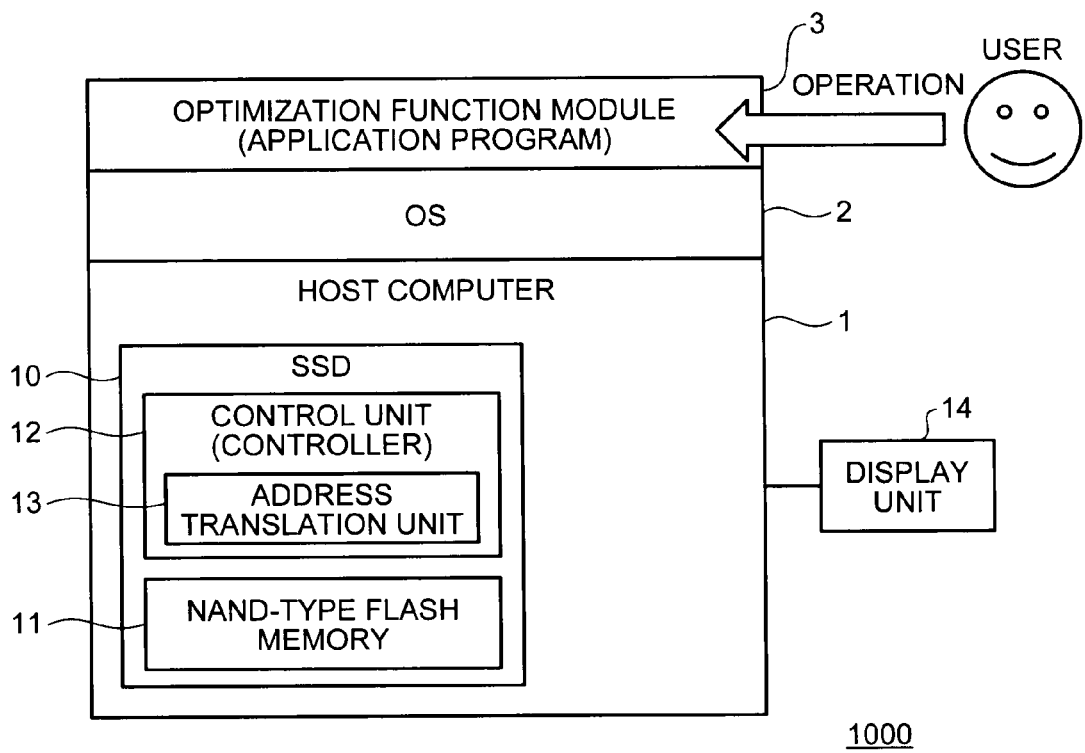
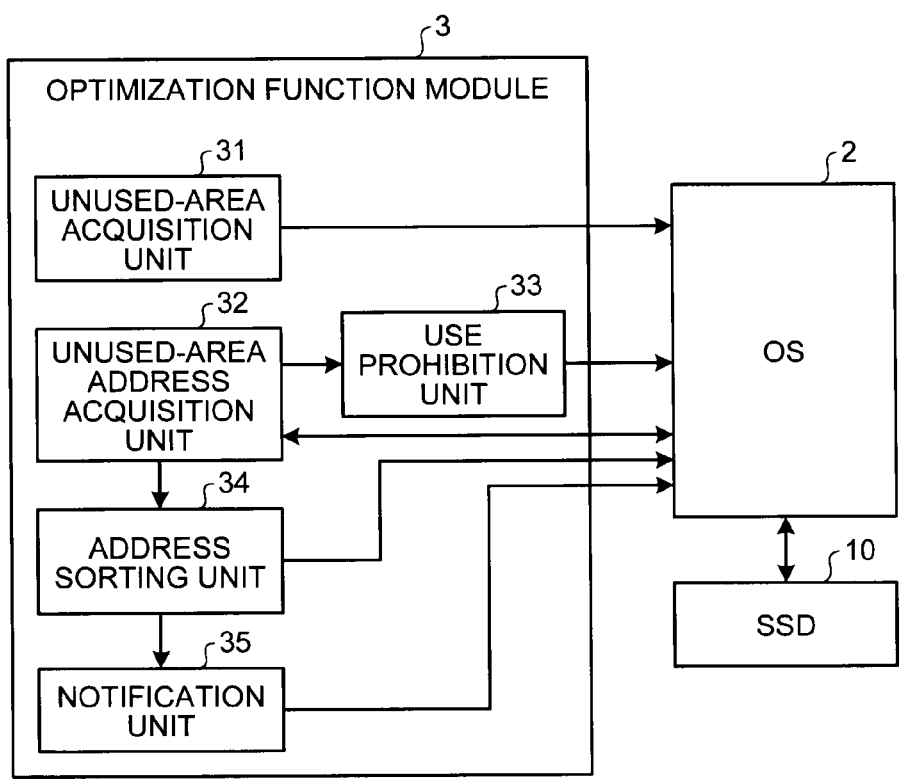

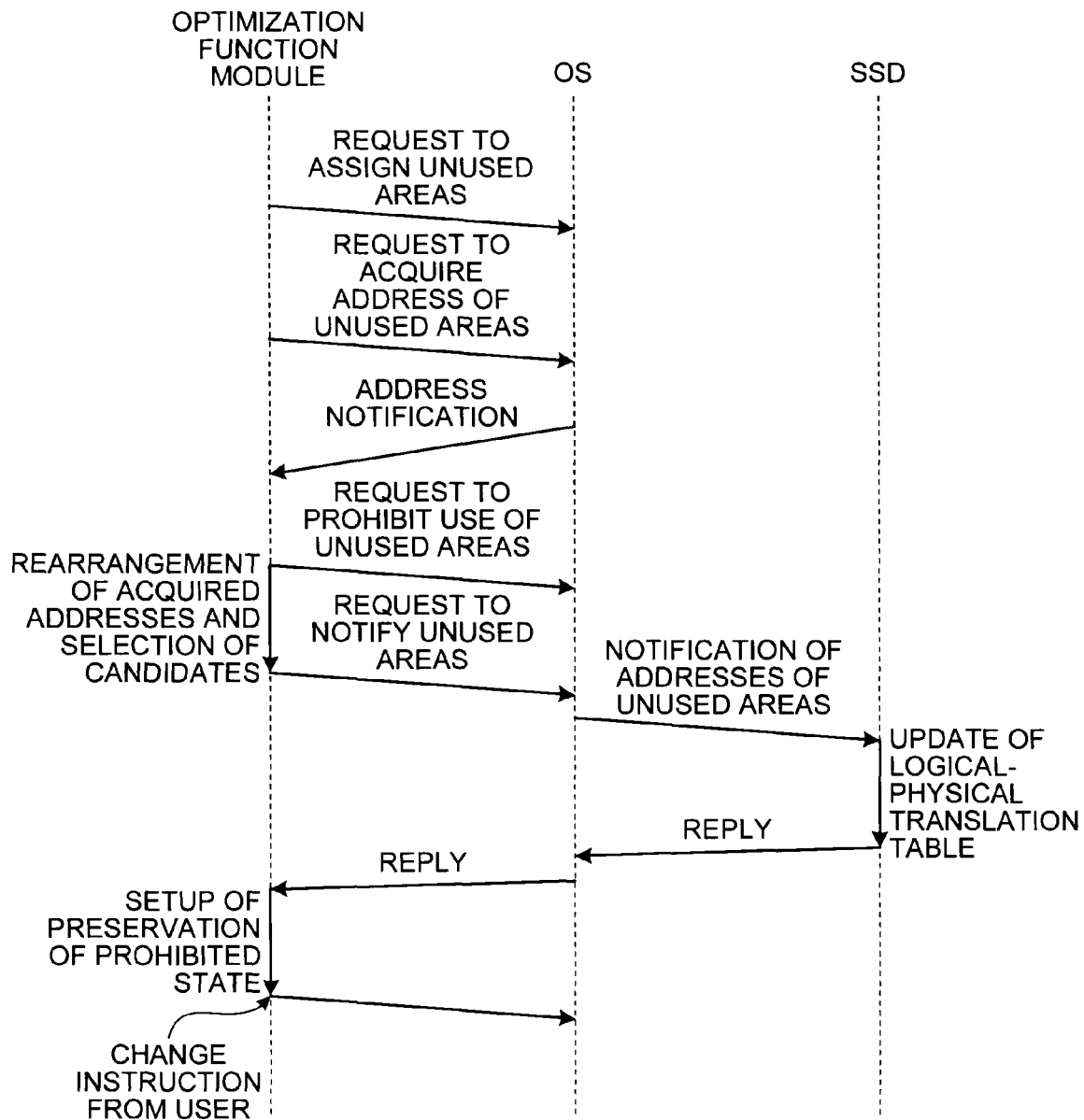

METHOD FOR CONTROLLING MEMORY SYSTEM, INFORMATION PROCESSING APPARATUS, AND STORAGE MEDIUM

CROSS-REFERENCE TO RELATED APPLICATIONS

This application is based upon and claims the benefit of priority from Japanese Patent Application No. 2011-086697, filed on Apr. 8, 2011; the entire contents of which are incorporated herein by reference.

FIELD

An embodiment described herein generally relates to a method for controlling a memory system, an information processing apparatus, and a storage medium.

BACKGROUND

An SSD (Solid State Drive) used as an external memory device of a host apparatus employs a nonvolatile memory, such as an NAND-type flash memory, which needs an erase operation at the time of rewriting data. It has been known that, in a case where such nonvolatile memories are used, copying of a large amount of data is performed inside an SSD at the time of execution of a rewrite request from a host apparatus. The life and the writing performance of a product are substantially affected by how large or small the amount of such copying is.

BRIEF DESCRIPTION OF THE DRAWINGS

FIG. 1 is a diagram illustrating a configuration of an information processing apparatus implementing a method according to an embodiment for controlling a memory system;

FIG. 2 is a block diagram illustrating in detail each functional unit included in an optimization function module while illustrating an OS and an SSD according to the embodiment;

FIG. 3 is a time chart illustrating the method according to the embodiment for controlling a memory system;

DETAILED DESCRIPTION

Figure 4:
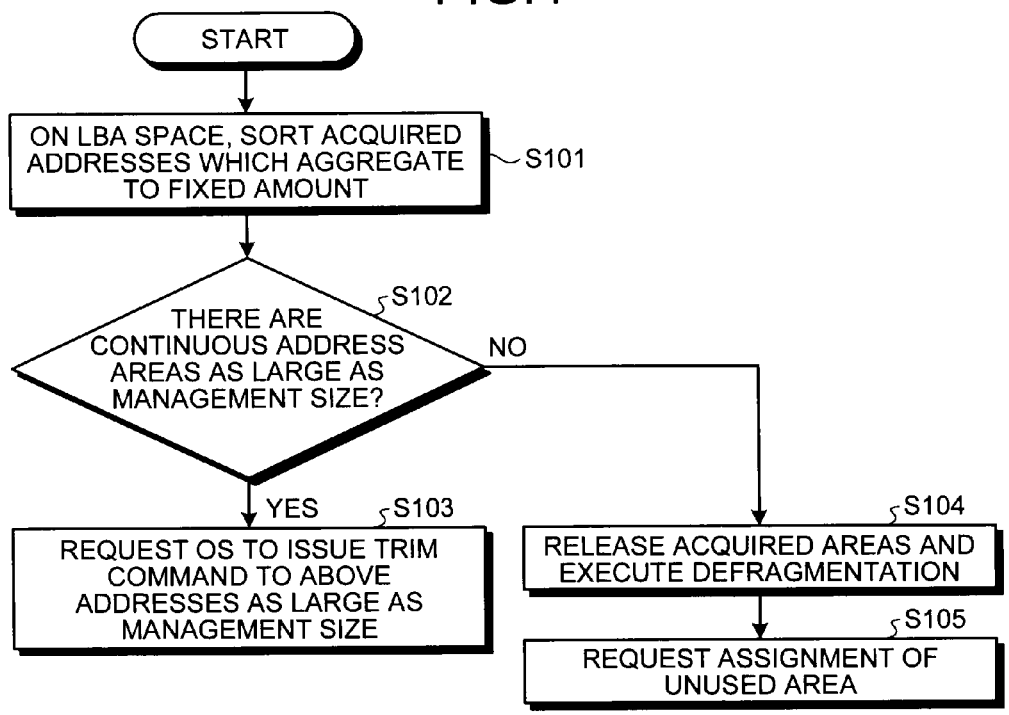
FIG. 4 is a flowchart illustrating operations of the optimization function module according to the embodiment.

A method, to be executed by an application program according to an embodiment, for controlling a memory system provided with a nonvolatile memory includes: acquiring an unused memory area from an operating system installed in an information processing apparatus provided with the memory system; prohibiting the acquired unused memory area from being used by any application program other than the above application program; acquiring the address of the acquired unused memory area; and notifying the address of the acquired unused memory area to the memory system. In the method according to an embodiment for controlling a memory system, prohibition state put by the prohibiting is preserved until receiving a change instruction.

In a controller (hereinafter, sometimes referred to as SSD controller) inside an SSD, a part of a physical memory capacity (physical capacity) of a NAND-type flash memory included inside the SSD is used as an area in which user data written from a host is recorded, whereas the remaining part is used as a nonvolatile cache (hereinafter referred to as cache) area used for effectively managing the user data. In other words, a capacity obtained by subtracting the capacity of the cache area from the physical capacity is a memory capacity (logical capacity) of the SSD that is actually usable by a user.

When such cache area is larger, a general SSD controller is more capable of preventing increase of the amount of data to be internally copied, and is more capable of improving the life and the writing performance of a product. However, increase of the capacity of the cache area leads to decrease of the logical capacity usable by the host, and therefore results in increase in price per unit of memory capacity of the SSD. For this reason, in most cases, a commercially available SSD has a cache area of only a small capacity installed therein.

On the other hand, in some cases, a user using an SSD attaches greater importance to the processing performance of the SSD than the memory capacity thereof depending on each purpose of use. Such a user improves the writing performance by intentionally setting a partition smaller than a memory capacity of an SSD to create an area not to be accessed by an OS (operating system) on a host apparatus and increase a capacity freely used by an SSD controller for a cache area or the like.

A method in which an area not to be accessed by an OS on a host apparatus is thus intentionally created is used in the expectation that, with a general SSD controller equipped with an address translation mechanism, a physical area is assigned to an area that has been written. Specifically, by intentionally creating an area not to be accessed by an OS on a host apparatus, it is expected that, while areas left in an unused state is daringly caused to exist inside the SSD, an SSD controller uses as a cache area a capacity that should have been assigned to these areas.

Additionally, the amount of data to be copied inside an SSD is greatly different depending on the capacity of a cache area and depending on a control method employed by the SSD controller. In general, information on address areas currently not being used by a host apparatus is not available inside an SSD, and an SSD controller performs data copying on the assumption that valid data exists also in the unused address areas. Execution of such useless data copying is one factor that increases the amount of data to be copied inside an SSD.

In order to eliminate useless data copying onto unused address areas, the ATA (Advanced Technology Attachment) standard provides a function (hereinafter, referred to as trim function) of executing a DATA SET MANAGEMENT command (hereinafter, referred to as trim (Trim) command) and notifying address areas to an SSD, the address area currently not being used by a host apparatus. In an SSD equipped for this function, an SSD controller releases address areas specified by the trim command, and handles the address areas as invalid data, whereby the amount of data to be copied is reduced. Effective points of the trim function are that the function makes it unnecessary to copy invalid data, and that the function makes it possible to use, as a cache area, capacities in which invalid data have been recorded.

In the method in which a user intentionally sets up a partition smaller than a memory capacity (logical capacity) of an SSD, however, a physical area is assigned, inside the SSD, to an address onto which writing has ever executed from a host apparatus even once. Therefore, it is necessary to set up unused address areas immediately after the product purchase or to use a special command which initializes the whole SSD.

Additionally, when the trim command is used to secure the performance of SSD, this sometimes causes the amount of writing to increase due to an invalidation process inside the SSD as a result of frequent execution of the command, or sometimes results in failure to secure necessary performance because execution of the command is too slow. Additionally, even though an available capacity inside an SSD is increased by execution of the trim function, this brings only a temporary effect since the available area again decreases once writing is executed from a host apparatus again.

An exemplary embodiment of a method for controlling a memory system, an information processing apparatus, and a storage medium will be explained below in detail with reference to the accompanying drawings. The present invention is not limited to the following embodiment.

First Embodiment

A configuration of an information processing apparatus 1000 implementing the method, according to the embodiment of the present invention, for controlling the memory system is illustrated in FIG. 1. The information processing apparatus 1000 includes a host computer 1 and an SSD 10. The method according to the embodiment for controlling the memory system is implemented by some of functions of an OS (operating system) 2 or by an optimization function module (an application program) 3 operating on the OS 2, the OS 2 being configured to manage resources of the host computer 1 to which the SSD 10 as a memory system is connected. The OS 2 which manages resources of the host computer 1 has a function of managing the addresses of areas on the SSD 10 in which valid data has been recorded, and the addresses of areas thereon not in use (hereinafter, referred to as unused areas).

A display unit 14, which displays information to a user, is connected to the host computer 1. The display unit 14 may be incorporated in the host computer 1. The host computer 1 is, for example, any one of various electronic devices such as a desktop type PC (personal computer), a laptop type PC, a net-book type PC or a smartphone, and is provided with a CPU (Central Processing Unit), a main memory such as a DRAM (Dynamic Random Access Memory), and an interface which enables connection of the SSD, the CPU being configured to execute various operating systems such as Windows (registered trademark). The interface between the host computer 1 and the SSD 10 is based on, for example, the SATA (Serial ATA) standard but is not limited to this.

The SSD 10 is provided with a NAND-type flash memory 11, which is a nonvolatile memory, and a control unit (SSD controller) 12. Upon receiving a write request from the host computer 1 through the above interface, the control unit 12 writes data into the NAND-type flash memory 11. Additionally, upon receiving from the host computer 1 through the above interface a request to read data, the SSD 10 reads data out from the NAND-type flash memory 11. In the write request and read request, the beginning logical addresses and data sizes for data to be written and data to be read are contained. As logical addresses, for example, LBAs (Logical Block Addresses) are adopted where serial numbers from 0 are assigned to logical capacities in each sector. The sector size is, for example, 512 B.

The NAND-type flash memory 11 includes a memory cell array and a peripheral circuit, the memory cell array having plural nonvolatile memory cells arranged on a matrix, the peripheral circuit being provided for controlling write, read and erase operations on the memory cell array. The memory cell array is configured by arraying plural blocks which are the smallest units for data erasure. Each of the blocks is configured by arraying plural pages which are the smallest unit for writing and reading data. The memory capacity of each one of the blocks is, for example, 1024 KB, whereas the memory capacity of each one of the pages is, for example, 8 KB. Each of the memory cells may be configured so as to store 1 bit (SLC: Single Level Cell) or may be configured so as to store 2 bits or more (MLC: Multi Level Cell). In the NAND-type flash memory 11, rewrite onto the same page in each of the blocks is not allowed until after the whole block including this page is erased once.

The control unit 12 executes, by use of hardware, software or combination thereof, various control functions for the above described write and read processing or the like performed on the NAND-type flash memory 11. As one of such control functions, the control unit 12 is provided with an address translation unit 13 having an address translation function. The address translation unit 13 performs translation (logical-physical address translation) between an LBA and a physical address on the NAND-type flash memory 11 by using a logical-physical (logical address-physical address) translation table, the LBA being a logical address used by the host computer 1 (OS 2). The unit (management size) for the logical-physical translation is arbitrary, but may be set equal to, for example, the page size or block size of the NAND-type flash memory, the cluster size of a file system adopted by the OS 2, or the like.

Generally, in an SSD where translation between a logical address and a physical address is thus carried out, continuous addresses on a logical address (LBA) space is set as a unit (management size, e.g., 8 KB) of the logical-physical translation, and the continuous addresses are collectively assigned to a physical area in the NAND-type flash memory 11, in order to prevent increase in size of a management table. The management size may be set equal to, for example, the page size of the NAND-type flash memory 11. In this case, data as large as the management size is stored on each one of the pages of the NAND-type flash memory 11, and the control unit 12 execute data copying in units of pages.

Each functional unit included in the optimization function module 3 is illustrated in detail, along with the OS 2 and the SSD 10, in FIG. 2. The optimization function module 3 is provided with unused-area acquisition unit 31, unused-area address acquisition unit 32, use prohibition unit 33, address sorting unit 34, and notification unit 35. Functions implemented by these units are described below with reference to a time chart of FIG. 3 illustrating the method according to the present embodiment for controlling the memory system.
(Request to Assign an Unused Area)

The unused-area acquisition unit 31 of the optimization function module 3 issues a "request to assign an unused area" to the OS 2. The OS 2, upon receiving the "request to assign an unused area", assigns an unused logical area. Additionally, depending on a file system adopted by the OS 2, there may be a case where not only an unused logical area is assigned but also an unused physical area on the SSD 10 is assigned. In any case, the OS 2 secures an unused area by at least assigning a logical memory area.
(Request to Acquire the Address of an Unused Area)

The unused-area address acquisition unit 32 of the optimization function module 3 issue a "request to acquire the address of an unused area" to the OS 2. The OS 2, upon receiving the "request to acquire the address of an unused area", notifies, to the unused-area address acquisition unit 32 of the optimization function module 3, a logical address (LBA) on the SSD 10 that is to be assigned to a memory area secured as the unused area by the OS 2 in response to the "request to assign an unused area" ("address notification" in FIG. 3).
(Request to Prohibit Use of an Unused Area)

Then, in order to prevent any other application program operating on the OS 2 from accessing the logical address acquired by the unused-area address acquisition unit 32, this address is set in a state prohibited from being used. Specifically, the use prohibition unit 33 of the optimization function module 3 issues a "request to prohibit use of an unused area" to the OS 2. This is intended to prevent occurrence of an inappropriate operation due to access of some other application program to an area on the SSD 10, on which an operation is about to be performed.

Here, as a method for prohibiting use of the unused area, a function of setting access rights is used in a case where the OS 2 has the function for prohibiting use. In a case where the OS 2 does not have the function, for example, a method in which the address is acquired after a file is newly created is conceivable. Additionally, an attribute such as write inhibit or read inhibit may be given to the created file. However, as long as the method enables prohibition of use of the unused area by other application program, how the method is implemented is not limited. Additionally, the order in which operations of acquiring the address of an unused area and prohibiting use of the unused area are performed is not limited.

Here, the present embodiment assumes that the number of logical addresses of the unused areas, which are acquired by the unused-area address acquisition unit 32 from the OS 2, is two or more. The unused-area address acquisition unit 32 repeats the acquisition of the logical address of the unused area until the total capacity of areas specified by plural logical addresses of the unused areas becomes a predetermined size. This is because higher processing efficiency is achieved when the trim function is executed collectively on a certain number of units. For example, the size may be one suited to specifications of the trim command since this command is capable of issuing multiple combinations of addresses and sizes at once.

Since the two or more logical addresses of unused areas are lined up in the order in which these addresses have been acquired, there is a possibility that the logical addresses are not lined up in the order of addresses on an LBA space. For this reason, in the present embodiment, the acquired addresses are rearranged (sorted) so as to be lined up in such a manner as to agree as far as possible with alignment of addresses on the LBA space, each of which is to be used as the unit (management size) for the logical-physical translation in the address translation unit 13 of the SSD 10. The optimization function module 3 sets, as candidate addresses to be notified to the SSD 10 by use of the trim function, these addresses obtained by the rearrangement. Operations of the optimization function module 3 are specifically described below by use of a flowchart of FIG. 4 as well.
(Request to Notify Unused Areas)

When the sizes of the unused areas on which the trim function should be executed have accumulated to become the above predetermined size in total after the address sorting unit 34 has received from the OS 2 through the "address notification" illustrated in FIG. 3 the logical addresses acquired by the unused-area address acquisition unit 32, the logical addresses are sorted so as to be lined up in accordance with the order of addresses on the LBA space (step S101). As a result of the sorting, it is determined whether there are continuous address areas as large as the management size (e.g., 8 KB) (step S102). When there are the continuous address areas (step S102: Yes), the notification unit 35 issues a "request to notify unused areas" to the OS 2. That is, the notification unit 35 requests the OS 2 to issue the trim command to the continuous unused address areas as large as the management size (step S103). Note that the optimization function module 3 has already retained information on the above management size. A method for that purpose may be a method in which the information is estimated based on the data size managed by the OS 2, or may be a method in which the information is acquired from the SSD 10 in accordance with a predetermined procedure.

Even when there are the continuous address areas (step S102: Yes), the address areas having a size smaller than the continuous areas as large as the predetermined management size are not to be notified. This is because, in a case where the size of the address areas is smaller than the smallest unit (management size) in copying data inside the SSD 10, invalidation of the areas is impossible and copying thereof is unavoidable even when the OS 2 notifies the SSD 10 through the trim function that these are unused areas. Additionally, this is also because not notifying address areas smaller than the continuous areas as large as the management size is expected to eliminate occurrence of useless processing due to the fact that the notification thereof also necessitates a resource inside the SSD 10 that is used for recording these address areas. However, in a case where a function of storing information on unused areas smaller than the management size in advance exists inside the SSD 10, or in order to avoid complexity of a judgment program, address areas smaller than the management size may be set as a target of the trim function.

When existence of continuous address areas as large as the management size (e.g., 8 KB) is not found in step S102 (step S102: No), it is thought that fragmentation of data has been in an advanced state on the file system of the host computer 1. In this case, the unused areas acquired by the unused-area acquisition unit 31 as a result of the "request to assign an unused area" in FIG. 3 are released temporarily, and some processing (defragmentation) that resolves fragmentation is executed on the host computer 1 (step S104). After the fragmentation is resolved, the optimization function module 3 executes processing from the "request to assign an unused area" (step S105).

Here, a method for resolving fragmentation, namely, defragmentation, is implemented by displaying on the display unit 14 a message requesting a user to resolve the fragmentation, by invoking a fragmentation resolving function provided by the OS 2, or the like. Alternatively, the optimization function module 3 itself may be internally provided with a function used for resolving fragmentation. The probability that continuous unused areas as large as the management size exist at the time when sorting in step S101 is performed again after step S105 is expected to be increased as a result of the defragmentation.

(Notification of the Addresses of Unused Areas)

The OS 2, upon receiving the "request to notify unused areas" in FIG. 3 from the notification unit 35 in step S103, notifies to the SSD 10 the continuous unused address areas as large as the management size ("notification of the addresses of unused areas" in FIG. 3). For example, the trim command may be used for this "notification of the addresses of unused areas". The trim command contains the beginning logical address (LBA) of at least one area subjected to trim, and the data size of areas subjected to trim.

Here, when the trim command is issued in a case where the areas subjected to trim which are to be notified has a capacity that is multiple times as large as the management size (for example, corresponding to 100 units each being an area of 8 KB), candidate areas for the command (e.g., 8 KB times 100 units) may be divided in groups (for example, each corresponding to 8 KB times 10 units) for plural times (e.g., ten times) of notification, and then, be notified to the SSD 10 by group at specified time intervals. Because, in the SSD 10, times are required for an operation on the logical-physical translation table managed by the address translation unit 13 on the basis of the received logical addresses, and for internal data shifting that accompanies the operation, these intervals are provided for waits for completion of processing inside the SSD 10 after the addresses of the unused areas are received.

Figure 5:
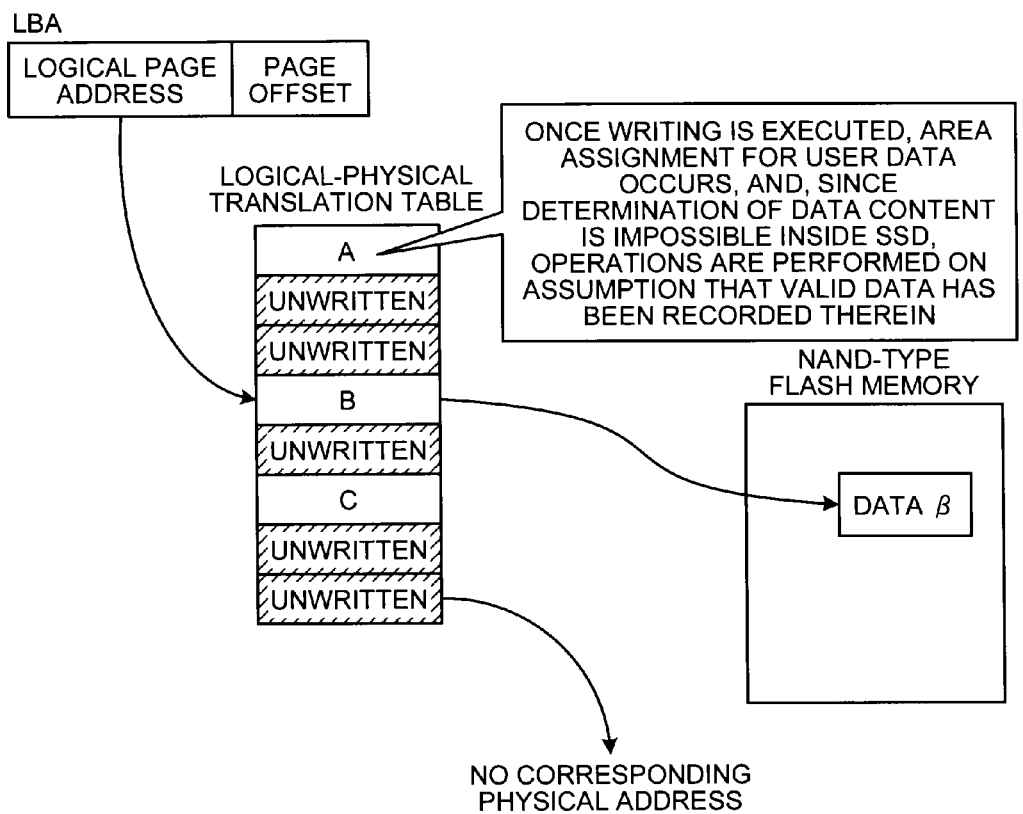
FIG. 5 is a diagram illustrating a logical-physical translation table managed by an address translation unit according to the embodiment.

The address translation unit 13 of the control unit 12 manages the logical-physical translation table illustrated in FIG. 5. The logical-physical translation table is a table that retains LBAs (composed of logical page addresses and page offsets) and physical addresses on the NAND-type flash memory 11 determined to correspond to the LBAs. Here, a case where the management size is equal to the page size of the NAND-type flash memory is shown, wherein the logical page addresses are set as indices of the logical-physical translation table. Each of the logical page addresses is composed of plural higher bits of the LBA, and indicates continuous address areas having a size equal to the page size of the NAND-type flash memory 11. The page offset is composed of plural lower bits of the LBA, and specifies a sector position inside each piece of data that is as large as the page size.

Figure 6:
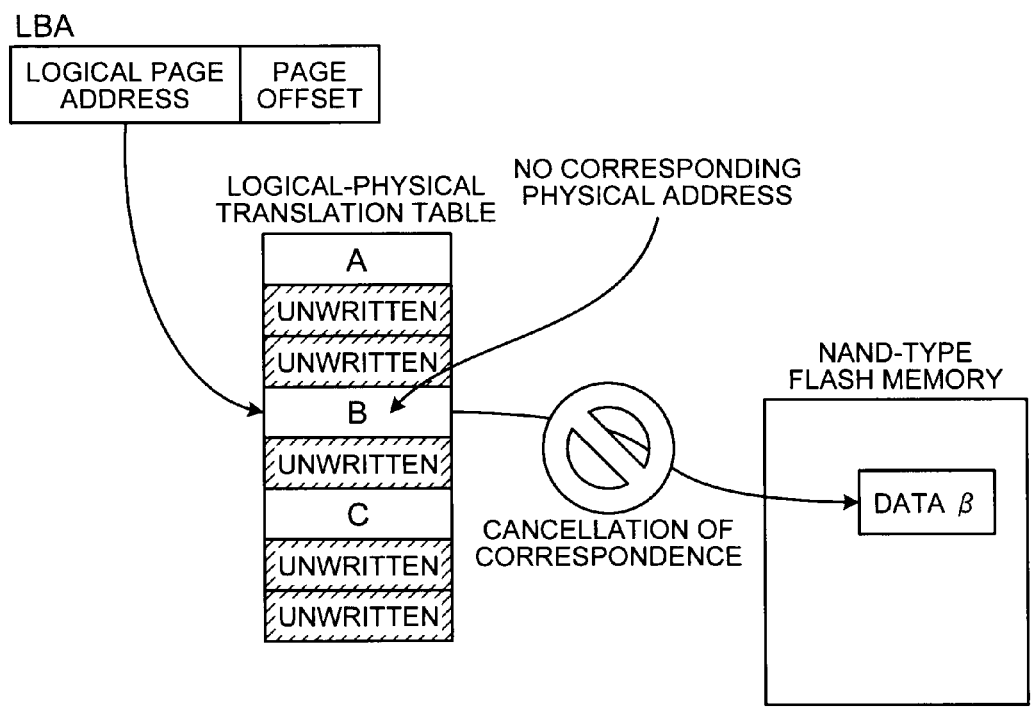
FIG. 6 is another diagram illustrating the logical-physical translation table managed by the address translation unit according to the embodiment.

Once writing is executed onto a certain one of the LBAs, written data is supposed to be treated thereafter as valid data inside the SSD 10 as in sections having "A", "B" and "C" in the logical-physical translation table illustrated in FIG. 5. Each section having "unwritten" in FIG. 5 indicates that, while the section exists under the LBAs, no physical address corresponding thereto exists. Here, the physical address "B" is deleted or rewritten as an invalid value when the SSD 10 receives the "notification of the addresses of unused areas" (the trim command) in a case where a logical address (LBA) notified by the trim command corresponds to the already written physical address "B" in FIG. 6. Thus, the correspondence between this LBA and the physical address is canceled (FIG. 6).

After the correspondence between the logical address (LBA) and the physical address is canceled, the data originally stored in the physical address "B" is handled as invalid data which is not associated with a logical address. When all the pages inside the block retain only the invalid data, it is possible to perform data erasure on this block at an arbitrary moment in time, and it is possible to use this block as the above described cache areas thereafter. After the logical-physical translation table is thus updated, as illustrated in FIG. 3, a "reply" is returned from the SSD 10 to the OS 2, and the OS 2, upon receiving the "reply" from the SSD 10, returns to the optimization module 3 a "reply" indicating that execution of the trim function has been completed.

(Preservation of Use-Prohibited State)

A logical address notified to the SSD 10 by use of the trim function is in a state prohibited from being used on the host computer 1, and corresponds, inside the SSD 10, to an area (hereinafter, referred to as trim-completed area) to which a physical area has not been assigned. Because it is expectable that such areas are used as a cache area inside the SSD 10, this state is changed after execution of the trim function to another state where a state with prohibited access to the trim-completed areas is preserved even after one or more times of power shutdown. The timing for prohibiting the use may be at a stage where the unused areas are secured as described above. In any case, it is needed only to preserve the prohibiting state until the user gives an instruction to the optimization function module 3 to change areas prohibited from being used.

Effects According to the Present Embodiment

As described above, the method according to the present embodiment for controlling the memory system provides areas prohibited from being used on the host computer 1, executes the trim function on the areas prohibited from being used, and, even after one or more times of power shutdown, preserves the states of the areas prohibited from being used, whereby it is made possible to easily increase the capacity of a cash area inside an SSD, and a user is enabled to easily improve the processing performance at an arbitrary moment in time desired by the user.

(Modification)

In the method for controlling the memory system according to the present embodiment, operations according to the following modification may be further performed. The following operations may be executed singly in combination with the method for controlling the memory system according to the present embodiment, or plural ones of the operations may be used in combination, and selection of those used in combination is arbitrary.

(Function of Confirming Whether the Trim Function has been Executed)

In some cases, an SSD equipped for the trim function is configured so that a predetermined designated data pattern can be read when the addresses of the trim-completed areas are read after the completion of processing supposed to be executed after the address of the unused areas are received, such as after the logical-physical translation table is operated. In order to be ready for such SSDs having these functions, after the completion of execution of the trim function, the optimization function module 3 may again read out the address of the trim-completed areas, confirm whether a predetermined data pattern has been read out, and, when the predetermined data pattern has not been read out, again execute the trim function to execute processing that reliably releases unused areas.

(Function of Again Executing the Trim Function on the Same Areas)

In an alternative manner, reading of data in areas to be trimmed is executed prior to execution of the trim function, and, when there is no change in data pattern after the completion of the trim function, the trim function may be executed again to execute processing that reliably releases unused areas. In this manner, it is possible to confirm whether the trim function has been executed. Alternatively, without confirming whether the trim function has been completed, the trim function may be again executed on an address, on which the trim function has been executed once, to execute processing that reliably releases unused areas.

(Function of Repetitively Executing the Trim Function)

Additionally, the optimization function module 3 may repetitively execute the "request to assign an unused areas", "request to acquire the address of an unused area", "address notification", "request to prohibit use of an unused area", "rearrangement of acquired addresses", "request to notify unused areas" and "notification of the addresses of unused areas" as illustrated in FIG. 3 in order to secure areas prohibited from being used which correspond to a capacity designated by the user. Further, the above mentioned defragmentation may be appropriately added to this repetitive processing.

(Function of Adding Trim-Completed Areas)

Additionally, in accordance with a request from the user, the system or the like, the optimization function module 3 may further acquire unused areas from the OS 2 by adding the above repetition, and execute the trim function thereon. The increase of trim-completed areas allows further increase in capacity available as a cache area to the SSD 10, whereby it is made possible to further improve the performance of the SSD 10. Although an amount by which areas prohibited from being used is increased may be determined in such a manner as to be set to a predetermined amount of increase or in such a manner that the user or the system is prompted to designate the amount of increase, there is no limitation on how the determination is implemented.

(Function of Decreasing Trim-Completed Areas)

Additionally, in such a case where available areas on the host computer 1 have decreased, the optimization function module 3 may provide, in accordance with a request from the user, the system or the like, a function of increasing a memory capacity usable by the host computer 1 by partially canceling the use-prohibited state of the trim-completed areas, and releasing to the OS 2 areas for which the use-prohibited state has been canceled. Although an amount by which areas prohibited from being used is decreased may be determined in such a manner as to be set to a predetermined amount of decrease or in such a manner that the user or the system is prompted to designate the amount of decrease, there is no limitation on how the determination is implemented.

(Function of Deleting Trim-Completed Areas)

Additionally, in accordance with a request from the user, the system or the like, the optimization function module 3 may provide a function of totally canceling the use-prohibited state of the trim-completed areas and releasing all the areas to the OS 2, thereby executing release of areas that have been secured for performance improvement.

(Function of Immediately Deleting Trim-Completed Areas)

Additionally, the optimization function module 3 may provide a function of, immediately after the completion of execution of the trim function, or at the same time as the completion of the execution, totally canceling the use-prohibited state of the trim-completed areas and releasing all the areas to the OS 2, thereby executing release of areas that have been secured for performance improvement.

(Function of Keeping the Proportion of Trim-Completed Areas Constant)

Additionally, in accordance to conditions under which the host computer 1 is utilized, the optimization function module 3 may provide a function of decreasing and increasing the trim-completed areas as described above so that the proportion of the trim-completed areas may become a value previously designated by the user or the system, and thereby adjusting areas secured for performance improvement. Additionally, the optimization function module 3 may provide a function of enabling the user or the system to change the previously designated proportion.

Examples

The method for controlling the memory system according to the above described present embodiment, and technologies related thereto are specifically described below in connection with a logical capacity and physical capacity of an actual SSD. As described above, the control unit 12 of the SSD 10 uses a part of the physical capacity as an area in which user data written from the host computer 1 is recorded, and uses the remaining part as a cache area used for effectively managing the user data. For this reason, a memory capacity of the SSD that is usable by the host computer 1 is set to a logical capacity smaller than the physical capacity of the NAND-type flash memory 11 that the SSD 10 is internally provided with, wherein this logical capacity is set to a value that is fixed depending on the capacity model of a product.

Figure 7:
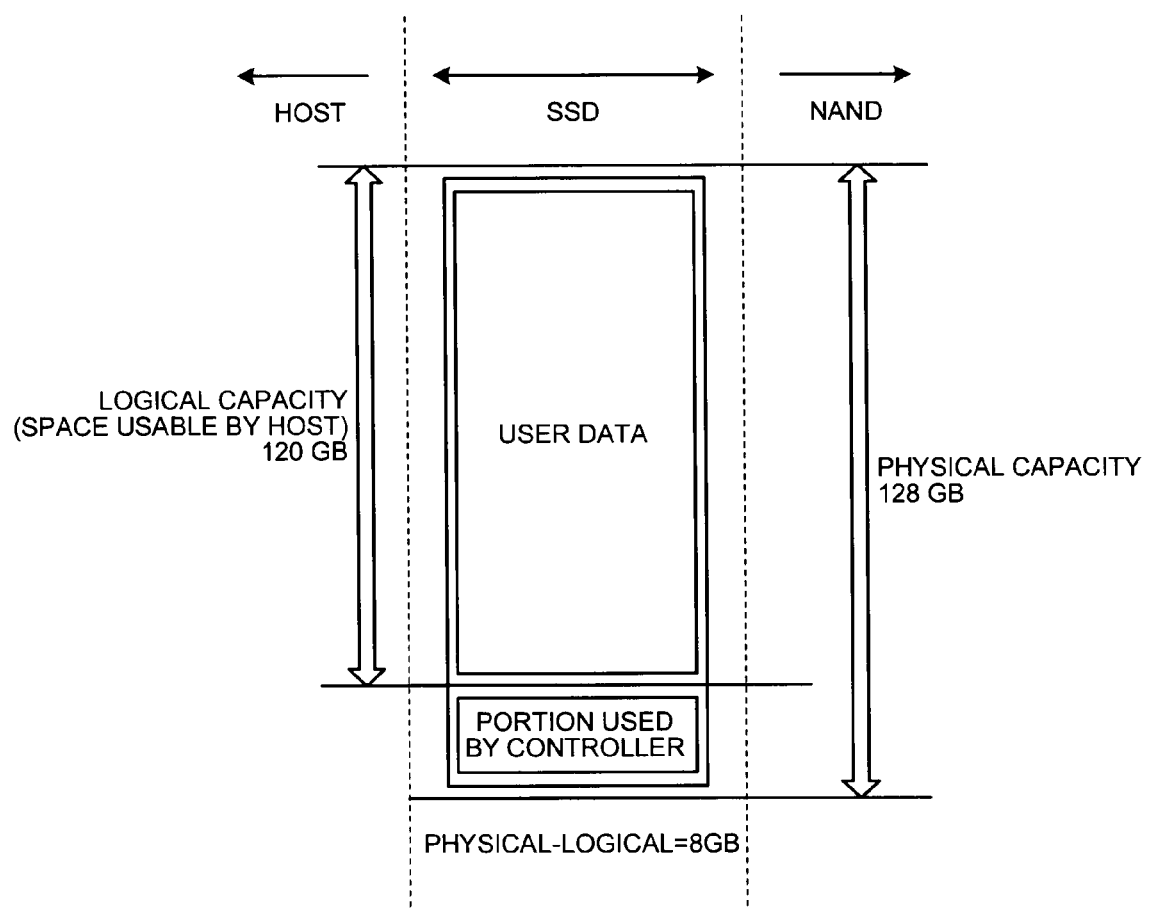
FIG. 7 is a diagram illustrating relations among a logical capacity, a physical capacity, user data, and a portion used by a controller.

FIG. 7 is a diagram illustrating relations among a logical capacity, a physical capacity, user data, and a portion used by a controller. For example, in a case of a product having a physical capacity of 128 GB and a logical capacity of 120 GB as illustrated in FIG. 7, the control unit 12 inside the SSD 10 uses 8 GB, which is a difference between the physical capacity and logical capacity. The control unit 12 is allowed to use this capacity of 8 GB as a cache area. The cache area is configured, for example, by use of plural blocks of the NAND-type flash memory 11.

The cache area may be managed, for example, by management size that is smaller than user data memory areas. In one example, while the cache area is managed by page size, the user data area is managed by block size. Additionally, for example, such a configuration where, while MLC control is performed on blocks assigned to the user data areas, SLC control is performed on blocks assigned to the cache area may be employed. Data to be written from the host computer 1 is written into the cache area at first, and thereafter, written into the user data area when a predetermined condition for expelling the data from the cache area is satisfied.

Figure 8:
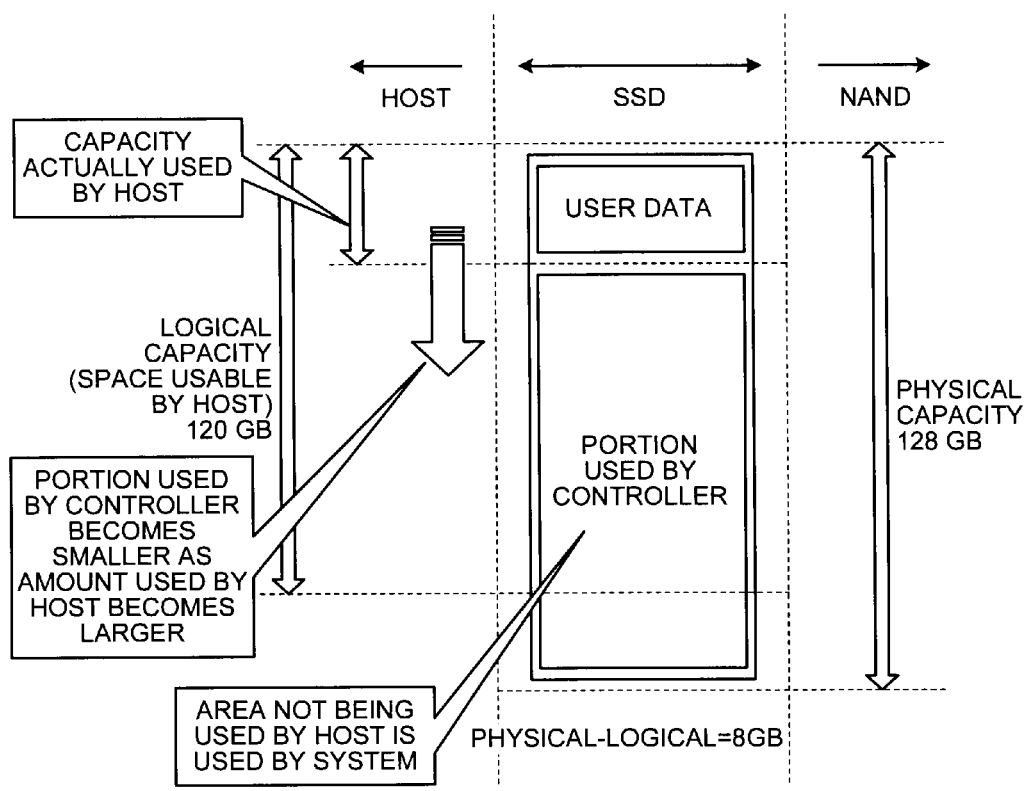
FIG. 8 is another diagram illustrating relations among a logical capacity, a physical capacity, user data, and a portion used by a controller.

FIG. 8 is another diagram illustrating relations among a logical capacity, a physical capacity, a user data, and a portion used by a controller. As illustrated in FIG. 8, when the host computer 1 uses only a part of a logical space available thereto, an area in which user data has not been recorded is usable as a cache area. In such a product, a capacity usable as a cache areas is supposed to decrease with increase in logical space used by the host computer 1, in other words, with increase of addresses that have been accessed even once by the host computer 1 to execute writing thereon.

Figure 9:
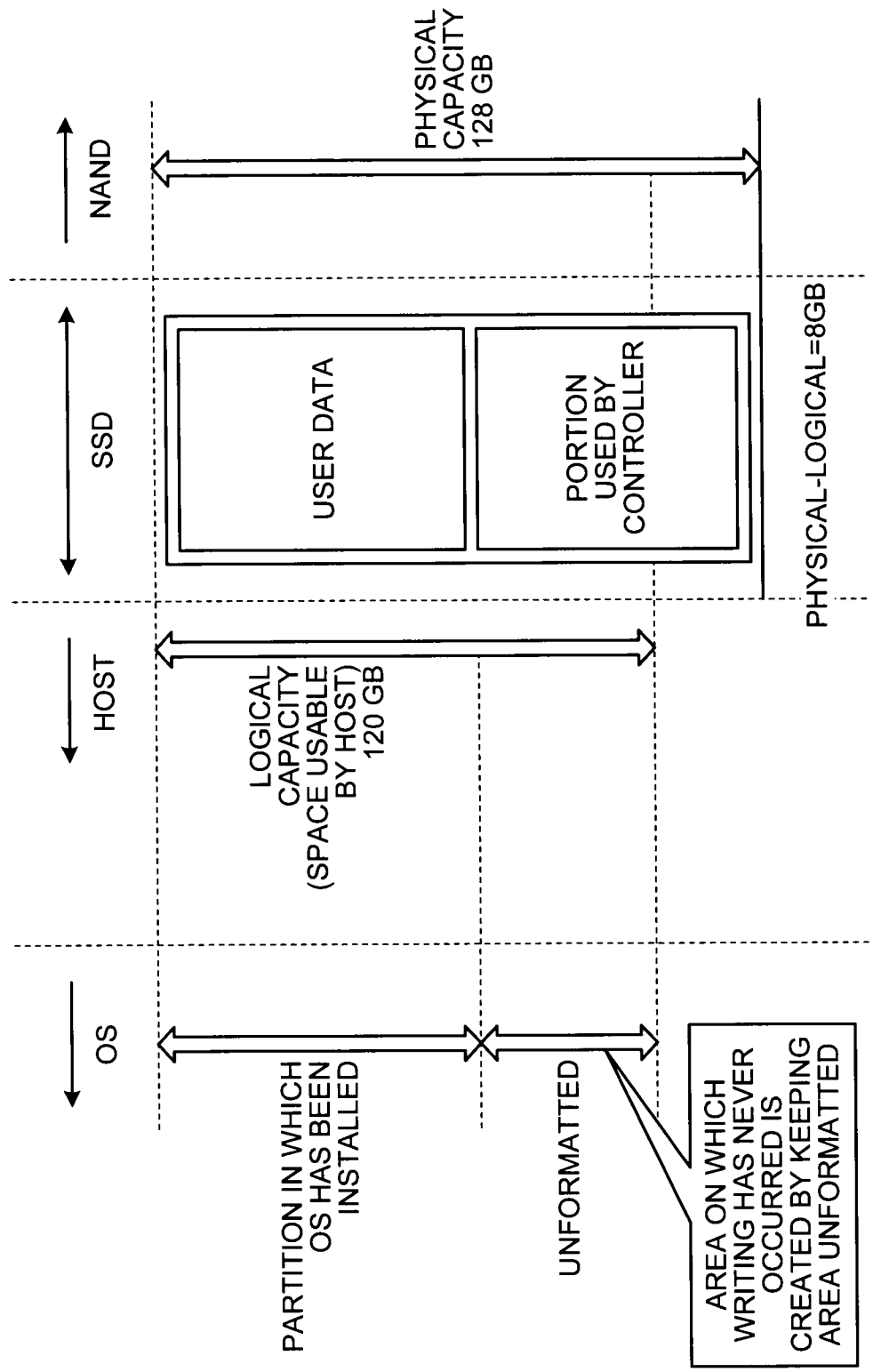
FIG. 9 is a diagram illustrating a state obtained when a user has set a partition.

FIG. 9 is a diagram illustrating a state obtained when a user has set a partition. The user intentionally sets a partition smaller than the memory capacity of an SSD as illustrated in FIG. 9 to create areas not to be accessed by the host apparatus, and increase a capacity freely usable by the control unit 12, whereby improvement of write performance is enabled. FIG. 9 illustrates an example where a partition of 64 GB has been set. It is possible for the control unit 12 to use a difference (unformatted area), which is 56 GB, between 120 GB corresponding to the logical capacity and 64 GB corresponding to the capacity of the partition in which the OS has been installed. Thus, it is made possible for the control unit 12 to use a capacity of 64 GB as a cache area, the capacity being obtained by adding up 8 GB originally secured and 56 GB.

Figure 10:
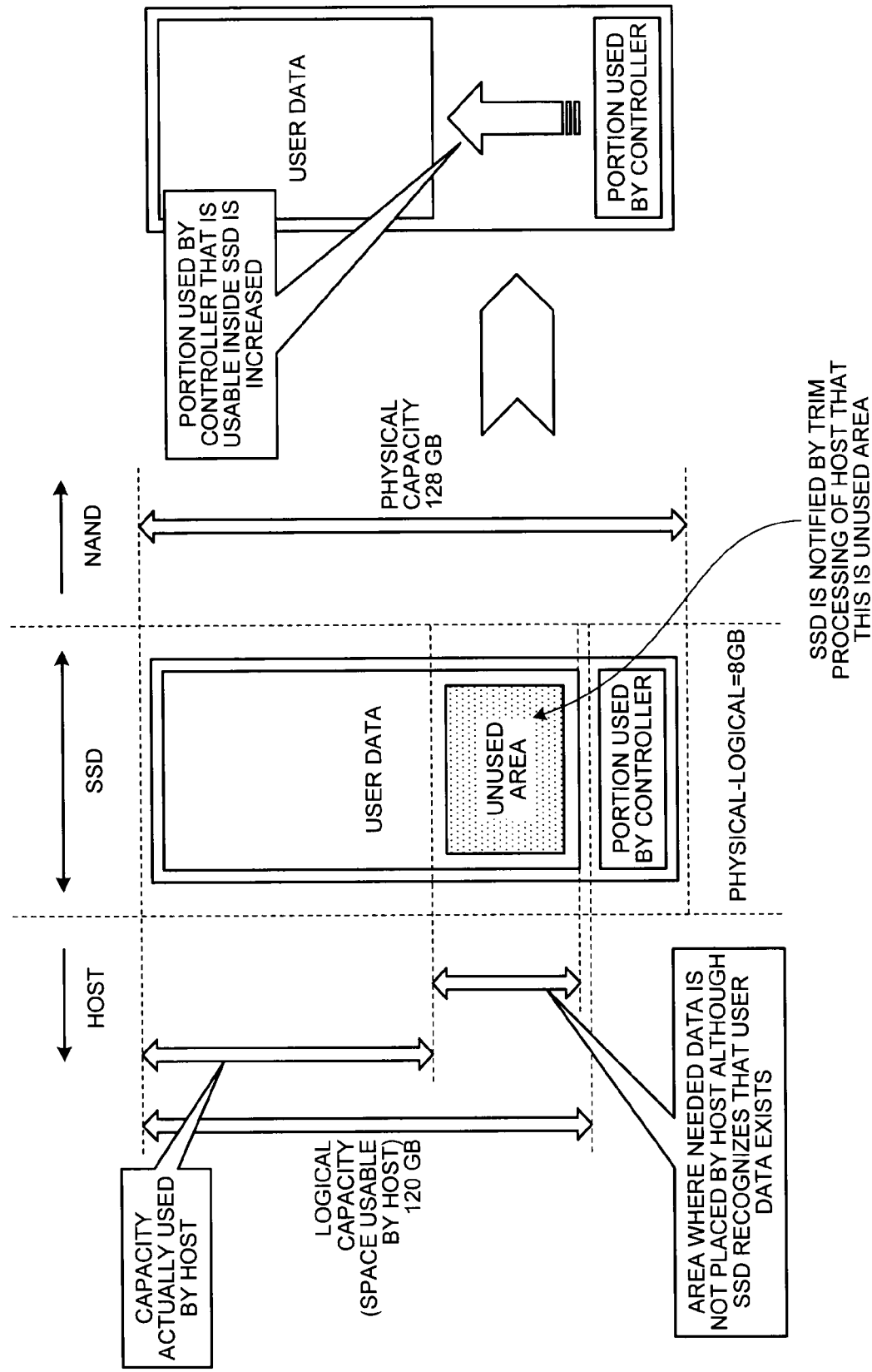
FIG. 10 is a diagram explaining actions exerted by the trim function on the SSD.

FIG. 10 is a diagram explaining actions exerted by the trim function on the SSD. In FIG. 10, while the SSD 10 recognizes that user data of 120 GB exists, a capacity usable by the control unit 12 is only 8 GB originally secured. On the other hand, the host computer 1 is not using the whole 120 GB, and an unused area, where the data needed by the host computer 1 is not placed, exists in a part thereof. Execution of the trim function on this unused area makes it possible to increase a capacity usable by the control unit 12 inside the SSD.

Figure 11:
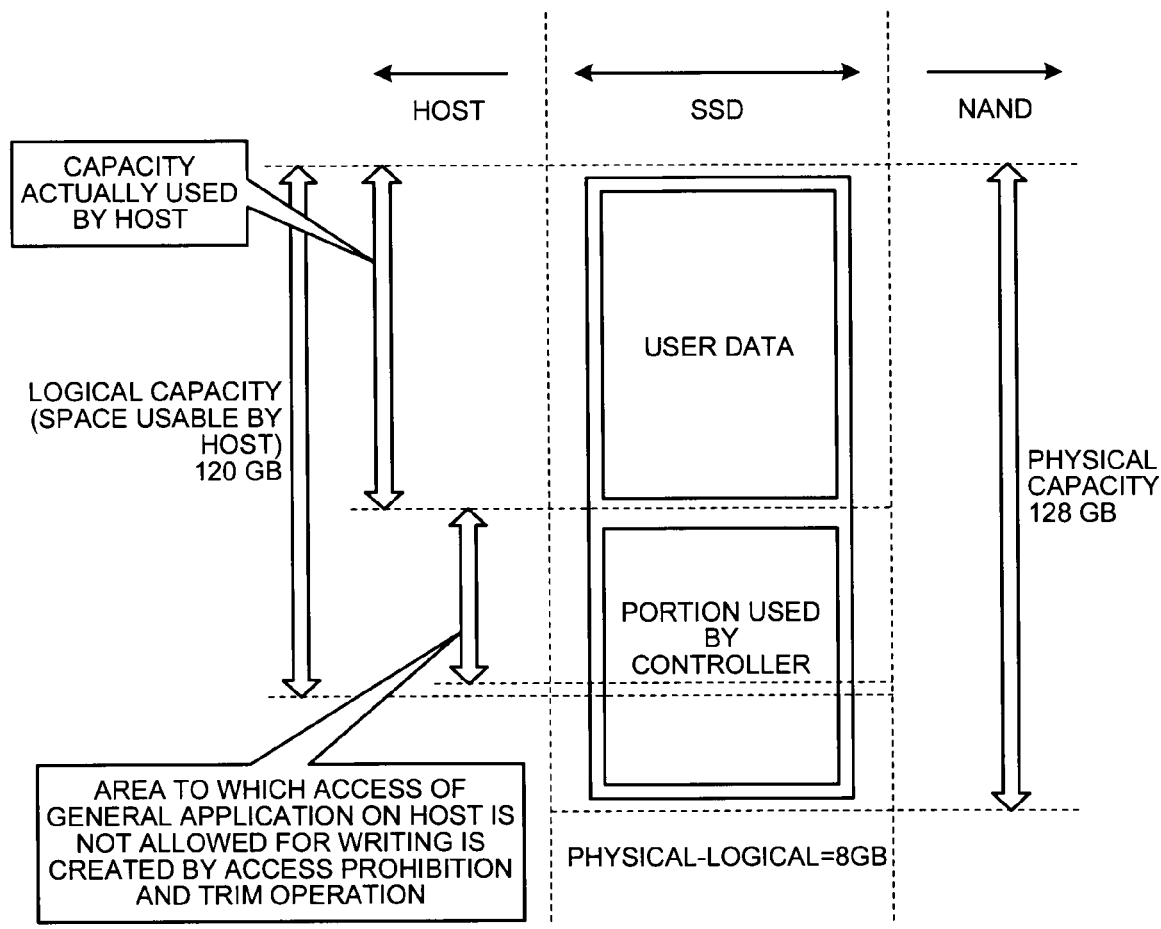
FIG. 11 is a diagram explaining actions exerted by the optimization function module according to the embodiment.

FIG. 11 is a diagram explaining actions exerted by the optimization function module 3 according to the present embodiment. The optimization function module 3 according to the present embodiment, as illustrated in FIG. 11, sets an area not being used by the host computer 1 (an unused area) as a use-prohibited area which is prohibited from being used by another application program. Further, the trim command is issued to a logical address included in this use prohibition area. The logical address notified to the SSD 10 by use of the trim function is in a state prohibited from being used on the host computer 1, and is an area (trim-completed area) to which a physical area is not assigned inside the SSD 10.

Figure 12:
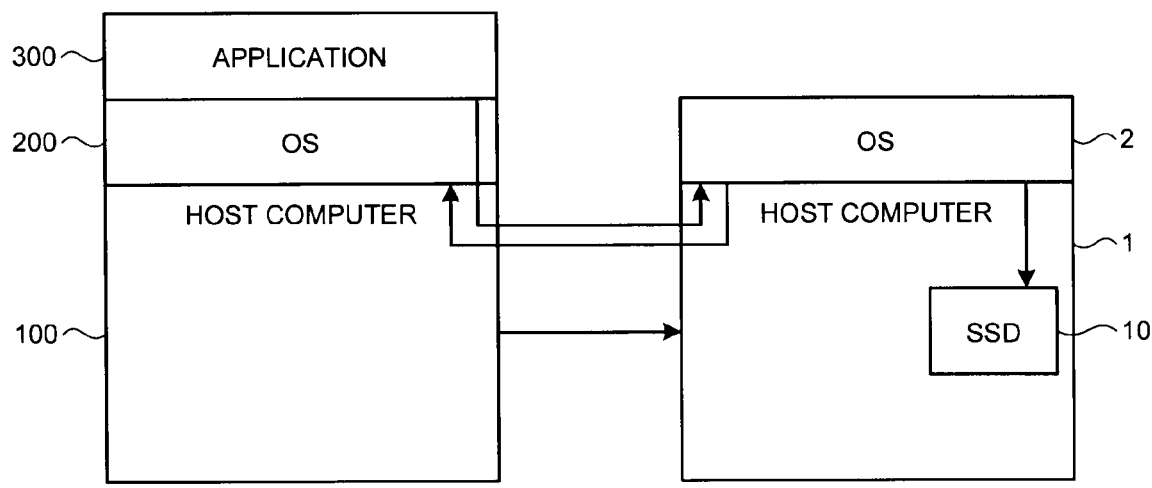
FIG. 12 is a diagram illustrating an example in which the optimization function module according to the embodiment is installed in an OS on an external host computer.

FIG. 12 is a diagram illustrating an example where the optimization function module 3 according to the present embodiment has been installed in an OS on an external host computer. As illustrated in FIG. 12, a method according to the embodiment for optimizing the memory system may be executed on the SSD 10 from an application (optimization module) 300 through wireless communication or wired communication via the OS 2 in the host computer 1 which is a main body, the application having been installed in an OS 200 in the external host computer 100. Here, the host computer 1 may be, for example, a smartphone, a portable game machine or the like.

Note that the optimization function module 3 may be delivered to a user by coming bundled with the SSD 10 on sale in a state stored in a non-transitory storage medium such as a CD-ROM or a USB (Universal Serial Bus) memory, or may be delivered to a user by being made downloadable via a network. Additionally, when an information processing apparatus is sold with the SSD 10 incorporated therein, the optimization function module 3 may have been installed beforehand. Additionally, the optimization function module 3 may be a resident program, may be configured to be regularly started up by a task scheduler, may be configured to be started up by a user at any moment in time, or may be configured to be automatically started up when a predetermined notification is received from the SSD 10.

Second Embodiment

Figure 13:
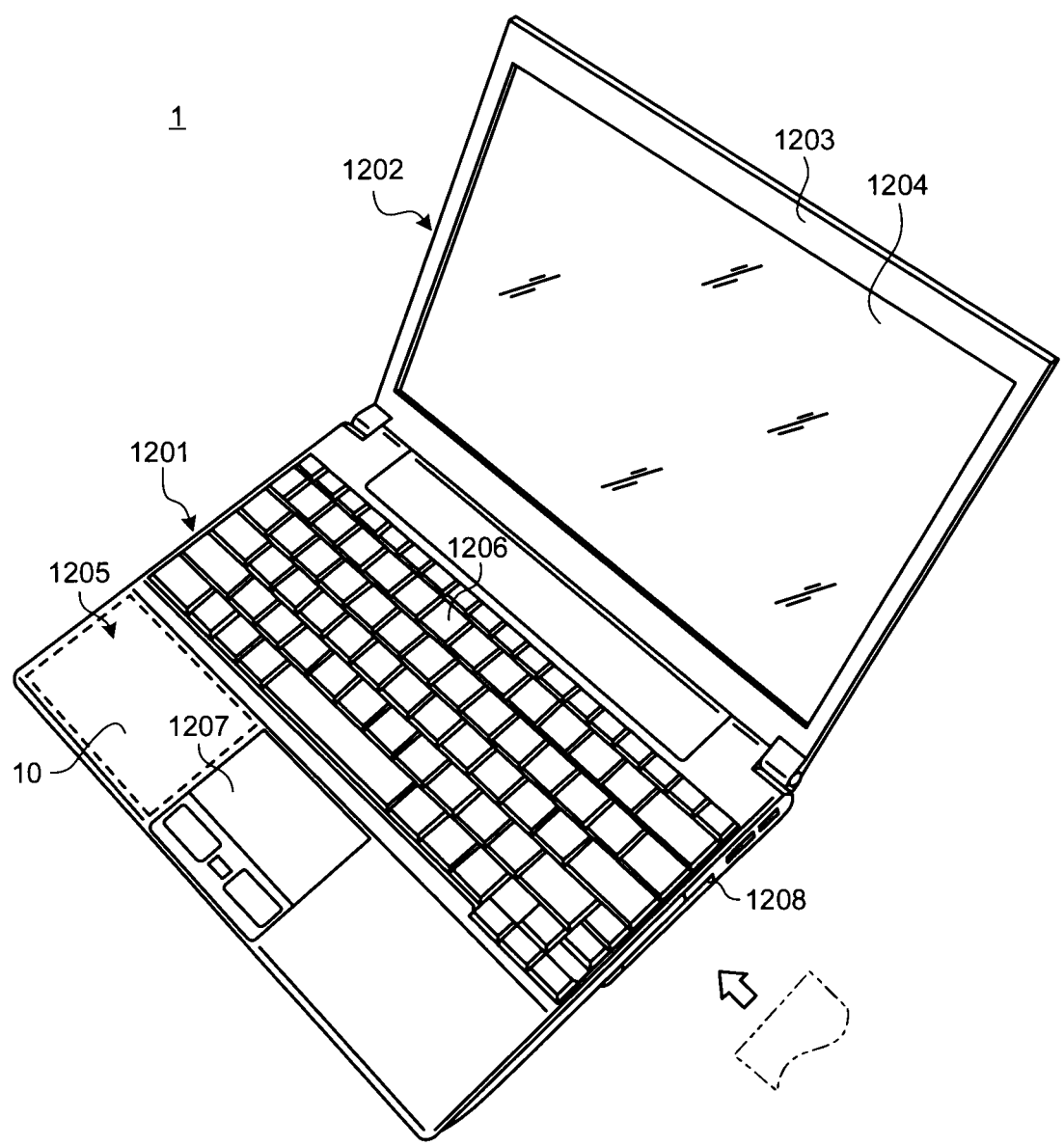
FIG. 13 is a perspective view illustrating an example of a host computer provided with an SSD.

FIG. 13 is a perspective view illustrating an example of a host computer 1 provided with an SSD 10. The host computer 1 includes a main unit 1201 and a display unit 1202. The display unit 1202 includes a display housing 1203 and a display device 1204 provided in the display housing 1203. The display device 1204 can display a message that prompts a user to execute a certain process, such as the defragmentation process.

The main unit 1201 includes a housing 1205, a keyboard 1206, and a touch pad 1207, which is a pointing device. For example, a main circuit board, an Optical Disk Device (ODD) unit, a card slot, and an SSD 10 are provided in the housing 1205.

The card slot is provided adjacent to the circumferential wall of the housing 1205. An opening portion 1208 facing the card slot is provided in the circumferential wall. The user can insert an additional device into the card slot through the opening portion 1208 from the outside of the housing 1205.

The SSD 10 may be provided in the host computer 1 instead of an HDD according to the related art and then used. Alternatively, the SSD 10 may be used as an additional device while being inserted into the card slot of the host computer 1.

Figure 14:
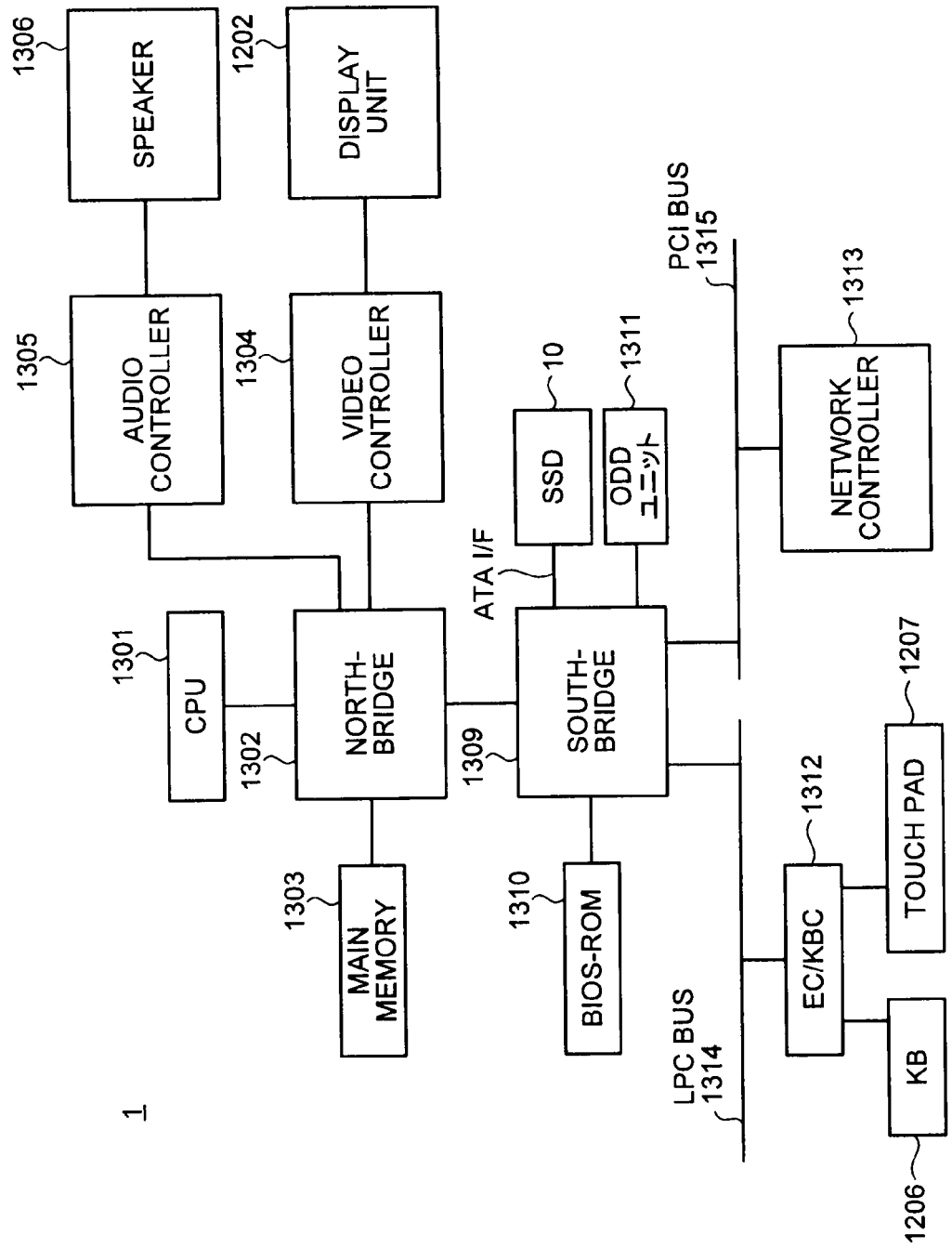
FIG. 14 is a view illustrating an example of a system structure of the host computer provided with the SSD.

FIG. 14 shows an example of the system structure of the host computer 1 provided with the SSD. The host computer 1 includes, for example, a CPU 1301, a northbridge 1302, a main memory 1303, a video controller 1304, an audio controller 1305, a southbridge 1309, a BIOS-ROM 1310, the SSD 10, an ODD unit 1311, an embedded controller/keyboard controller IC (EC/KBC) 1312, and a network controller 1313.

The SSD 10 stores the OS 2 and the optimization function module 3 which are illustrated in FIG. 1. At least part of the OS 2 and the optimization function module 3 is loaded from the SSD 10 to the main memory 1303.

The CPU 1301 is a processor that is provided in order to control the operation of the host computer 1 and executes the OS 2 which is loaded from the SSD 10 to the main memory 1303. When the ODD unit 1311 can perform at least one of a process of reading data from an inserted optical disk and a process of writing data to the optical disk, the CPU 1301 performs the process.

In addition, the CPU 1301 executes a system Basic Input Output System (BIOS) stored in the BIOS-ROM 1310. The system BIOS is a program for controlling hardware in the host computer 1.

The northbridge 1302 is a bridge device that connects a local bus of the CPU 1301 and the southbridge 1309. The northbridge 1302 includes a memory controller that controls access to the main memory 1303.

The northbridge 1302 has a function of communicating with the video controller 1304 and the audio controller 1305 through an Accelerated Graphics Port (AGP) bus 1314.

The main memory 1303 temporarily stores programs or data and functions as a work area of the CPU 1301. The main memory 1303 is, for example, a RAM.

The video controller 1304 is a video reproduction controller that controls the display unit 1202 used as a display monitor of the host computer 1.

The audio controller 1305 is an audio reproduction controller that controls a speaker 1306 of the host computer 1.

The southbridge 1309 controls each device on an Low Pin Count (LPC) bus and each device on a Peripheral Component Interconnect (PCI) bus 1315. In addition, the southbridge 1309 controls the SSD 10, which is a storage device storing various kinds of software and data, through an ATA interface.

The host computer 1 accesses the SSD 10 in a sector unit. For example, a write command, a read command, and a cache flash command are input to the SSD 10 through the ATA interface.

The southbridge 1309 has a function of controlling access to the BIOS-ROM 1310 and the ODD unit 1311.

The EC/KBC 1312 is a one-chip microcomputer obtained by integrating an embedded controller for managing power with a keyboard controller for controlling the keyboard (KB) 1206 and the touch pad 1207.

The EC/KBC 1312 has a function of turning on or off a power supply of the host computer 1 according to the operation of a power button by the user. The network controller 1313 is a communication device that communicates with an external network, such as the Internet.

While certain embodiments have been described, these embodiments have been presented by way of example only, and are not intended to limit the scope of the inventions.

Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method, to be executed by an application program, for controlling a memory system provided with a nonvolatile memory, the method comprising:
   acquiring an unused memory area from an operating system installed in an information processing apparatus provided with the memory system;
   prohibiting the acquired unused memory area from being used by any application program other than the application program;
   acquiring an address of the acquired unused memory area; and
   notifying the address of the acquired unused memory area to the memory system,
   wherein a prohibition state set by the prohibiting is preserved until receiving a change instruction.

2. The method for controlling the memory system according to claim 1, wherein the prohibition state is sustained even after power shutoff or startup of the information processing apparatus.

3. The method for controlling the memory system according to claim 1, wherein the notifying is performed at a predetermined time interval.

4. The method for controlling the memory system according to claim 1, wherein the notifying further comprises:
   after acquiring a predetermined number of addresses of the acquired unused memory area, the predetermined number being at least two, rearranging the predetermined number of addresses of the acquired unused memory area in sequence,
   wherein, after the rearranging, notification is made when the predetermined number of addresses of the acquired unused memory area are continuous in such a manner as to equal in size a unit of management used in a logical-physical translation table.

5. The method for controlling the memory system according to claim 4, wherein, after the rearranging, a message that prompts a user to execute defragmentation is displayed when the predetermined number of addresses of the acquired unused memory area are not continuous in such a manner as to equal in size the unit of management used in the logical-physical translation table.

6. The method for controlling the memory system according to claim 4, wherein, after the rearranging, when the predetermined number of addresses of the acquired unused memory area are not continuous in such a manner as to equal in size the unit of management used in the logical-physical translation table, the unused memory area is acquired after defragmentation is executed on a file system managed by the operating system.

7. The method for controlling the memory system according to claim 1, wherein the acquiring of the unused memory area, the prohibiting, the acquiring of the address, and the notifying are repeated in such a manner that a total of data capacities of the unused memory areas notified by the notifying is equal to a predetermined capacity.

8. The method for controlling the memory system according to claim 1, wherein the acquiring of the unused memory area, the prohibiting, the acquiring of the address, and the notifying are repeated in such a manner that a total of data capacities of the unused memory areas notified by the notifying comes to account for a predetermined proportion of a capacity of an entire memory area in the nonvolatile memory.

9. The method for controlling the memory system according to claim 1, wherein the acquiring of the unused memory area, the prohibiting, the acquiring of the address, and the notifying are repeated in such a manner that a total of data capacities of the unused memory areas notified by the notifying increases in capacity as designated in the change instruction.

10. The method for controlling the memory system according to claim 1, comprising acquiring a plurality of unused memory areas, wherein the prohibition put on the unused memory areas prohibited from being used by the prohibiting is partially released in such a manner that a total of data capacities of the unused memory areas notified by the notifying decreases in capacity as designated in the change instruction.

11. The method for controlling the memory system according to claim 1, wherein the prohibition of use of the unused memory area prohibited by the prohibiting from being used is released depending oil designation, the designation being contained in the change instruction.

12. An information processing apparatus comprising:
   a memory system provided with a nonvolatile memory;
   an optimization function module including:
   an unused-area acquisition unit configured to acquire an unused memory area from an operating system;
   a use prohibition unit configured to prohibit the acquired unused memory area from being used by any application program that operates on the operating system;
   an unused-area address acquisition unit configured to acquire an address of the acquired unused memory area; and
   a notification unit configured to notify the address of the acquired unused memory area to the memory system;
   wherein a prohibition state set by the use prohibition unit is preserved until receiving a change instruction; and
   a main memory which is capable of storing at least part of the operating system and the optimization function module.

13. The information processing apparatus according to claim 12, wherein the prohibition state is sustained even after power shutoff or startup thereof.

14. The information processing apparatus according to claim 12, wherein the notifying is performed at a predetermined time interval.

15. The information processing apparatus according to claim 12, wherein the notification unit further comprises:
   an address sorting unit configured to, after acquiring a predetermined number of addresses of the acquired unused memory area, the predetermined number being at least two, rearrange the predetermined number of addresses of the acquired unused memory area in sequence, wherein, after the rearranging is performed by the address sorting unit, notification is made when the predetermined number of addresses of the acquired unused memory area are continuous in such a manner as to equal in size a unit of management used in a logical-physical translation table.

16. The information processing apparatus according to claim 15, wherein, after the rearranging is performed by the address sorting unit, a message that prompts a user to execute defragmentation is displayed when the predetermined number of addresses of the acquired unused memory area are not continuous in such a manner as to equal in size the unit of management used in the logical-physical translation table.

17. The information processing apparatus according to claim 15, wherein, after the rearranging is performed by the address sorting unit, when the predetermined number of addresses of the acquired unused memory area are not continuous in such a manner as to equal in size the unit of management used in the logical-physical translation table, the unused-area acquisition unit executes again the acquisition of the unused memory area after defragmentation is executed on a file system managed by the operating system.

18. The information processing apparatus according to claim 12, wherein operations of the unused-area acquisition unit, the use prohibition unit, the unused-area address acquisition unit, and the notification unit are repeated by the optimization function module in such a manner that a total of data capacities of the unused memory areas notified by the notification unit is equal to a predetermined capacity.

19. The information processing apparatus according to claim 12, wherein operations of the unused-area acquisition unit, the use prohibition unit, the unused-area address acquisition unit, and the notification unit are repeated by the optimization function module in such a manner that a total of data capacities of the unused memory areas notified by the notification unit comes to account for a predetermined proportion of a capacity of an entire memory area in the nonvolatile memory.

20. The information processing apparatus according to claim 12, wherein operations of the unused-area acquisition unit, the use prohibition unit, the unused-area address acquisition unit, and the notification unit are repeated by the optimization function module in such a manner that a total of data capacities of the unused memory areas notified by the notification unit increases in capacity as designated in the change instruction.

21. The information processing apparatus according to claim 12, wherein
the unused-area acquisition unit is configured to acquire a plurality of unused memory areas from the operating system; and
the prohibition put on the unused memory areas prohibited from being used is partially released by the use prohibition unit in such a manner that a total of data capacities of the unused memory areas notified by the notification unit decreases in capacity as designated in the change instruction.

22. The information processing apparatus according to claim 12, wherein the prohibition of use of the acquired unused memory area prohibited by the use prohibition unit from being used is released depending on designation, the designation being contained in the change instruction.

23. A non-transitory storage medium comprising instructions that cause an information processing apparatus, which is provided with a memory system having a nonvolatile memory, to execute processing for:
acquiring an unused memory area from an operating system installed in the information processing apparatus;
prohibiting the acquired unused memory area from being used by any instruction other than the instructions;
acquiring an address of the acquired unused memory area;
notifying the address of the acquired unused memory area to the memory system; and,
until receiving a change instruction, preserving a prohibition state set by the prohibiting.

24. The non-transitory storage medium according to claim 23, wherein the prohibition state is sustained even after power shutoff or startup of the information processing apparatus.

25. The non-transitory storage medium according to claim 23, wherein the notifying is performed at a predetermined time interval.

26. The non-transitory storage medium according to claim 23, wherein the notifying further comprises:
after acquiring a predetermined number of addresses of the acquired unused memory area, the predetermined number being at least two, rearranging the predetermined number of addresses of the acquired unused memory area in sequence,
wherein, after the rearranging, notification is made when the predetermined number of addresses of the acquired unused memory area are continuous in such a manner as to equal in size a unit of management used in the in a logical-physical translation table.

27. The non-transitory storage medium according to claim 26, further comprising instructions that cause the information processing apparatus to execute processing for:
after the rearranging, displaying a message when the predetermined number of addresses of the acquired unused memory area are not continuous in such a manner as to equal in size the unit of management used in the logical-physical translation table, the message prompting a user to execute defragmentation.

28. The non-transitory storage medium according to claim 26, wherein, after the rearranging, when the predetermined number of addresses of the acquired unused memory area are not continuous in such a manner as to equal in size the unit of management used in the logical-physical translation table, the unused memory area is acquired after defragmentation is executed on a file system managed by the operating system.

29. The non-transitory storage medium according to claim 23, wherein the acquiring of the unused memory area, the prohibiting, the acquiring of the address, and the notifying are repeated in such a manner that a total of data capacities of the unused memory areas notified by the notifying is equal to a predetermined capacity.

30. The non-transitory storage medium according to claim 23, wherein the acquiring of the unused memory area, the prohibiting, the acquiring the address, and the notifying are repeated in such a manner that a total of data capacities of the unused memory areas notified by the notifying comes to account for a predetermined proportion of a capacity of an entire memory area in the nonvolatile memory.

31. The non-transitory storage medium according to claim 23, wherein the acquiring of the unused memory area, the prohibiting, the acquiring of the address, and the notifying are repeated in such a manner that a total of data capacities of the unused memory areas notified by the notifying increases in capacity as designated in the change instruction.

32. The non-transitory storage medium according to claim 23, further comprising instructions that cause the information processing apparatus to execute processing for:
acquiring a plurality of unused memory areas; and
partially releasing the prohibition put on the unused memory areas prohibited from being used by the prohibiting, in such a manner that a total of data capacities of the unused memory areas notified by the notifying decreases in capacity as designated in the change instruction.

33. The non-transitory storage medium according to claim 23, further comprising instructions that cause the information processing apparatus to execute processing for:
depending on designation, releasing the prohibition of use of the acquired unused memory area prohibited by the prohibiting from being used, the designation being contained in the change instruction.

* * * * *